United States Patent [19]

Nagashima

[11] Patent Number: 4,945,436
[45] Date of Patent: Jul. 31, 1990

[54] DOUBLE-SIDED RECORDING METHOD USING SLANTED GUIDE PLATES UPSTREAM AND DOWNSTREAM OF RECORDING HEADS

[75] Inventor: Yasuo Nagashima, Tokyo, Japan
[73] Assignee: Fuji Photo Film Co., Ltd., Kanagawa, Japan
[21] Appl. No.: 222,667
[22] Filed: Jul. 21, 1988

[30] Foreign Application Priority Data

Jul. 27, 1987 [JP] Japan ................... 62-185586
Jul. 27, 1987 [JP] Japan ................... 62-185587

[51] Int. Cl.$^5$ .................................. G11B 15/60
[52] U.S. Cl. ........................... 360/104; 360/99.08; 360/130.2; 360/130.34
[58] Field of Search ............. 360/130.34, 130.2, 133, 360/104, 103, 99.08

[56] References Cited

U.S. PATENT DOCUMENTS

| | | | |
|---|---|---|---|
| 4,652,959 | 3/1987 | Hamada | 360/130.3 |
| 4,652,960 | 3/1987 | MacDonald, II | 360/130.34 |
| 4,794,482 | 12/1988 | Horio et al. | 360/104 X |
| 4,809,105 | 2/1989 | Imanishi et al. | 360/130.34 X |
| 4,814,922 | 3/1989 | Osanai | 360/130.34 X |
| 4,833,556 | 5/1989 | Kosarko et al. | 360/102 |

FOREIGN PATENT DOCUMENTS

61-9868  1/1986  Japan.
62-1168  1/1987  Japan.

*Primary Examiner*—John H. Wolff
*Attorney, Agent, or Firm*—Sughrue, Mion, Zinn, Macpeak & Seas

[57] ABSTRACT

A double-sided recording method comprising disposing first and second magnetic heads opposed to each other on opposite sides of a rotating flexible magnetic disk, and placing guide plates at the upstream or downstream side of the first or second magnetic head. The guide plates are slanted to apply negative or positive pressure to the flexible magnetic disk and to cause the flexible magnetic disk to be attracted or urged to the first or second magnetic head, thereby ensuring close contact of the flexible magnetic disk with the first or second magnetic head.

9 Claims, 6 Drawing Sheets

DOUBLE-SIDED RECORDING METHOD USING SLANTED GUIDE PLATES UPSTREAM AND DOWNSTREAM OF RECORDING HEADS

FIELD OF THE INVENTION

This invention relates to a double-sided recording method for a flexible magnetic disk.

BACKGROUND OF THE INVENTION

Figures 10A, 10B:
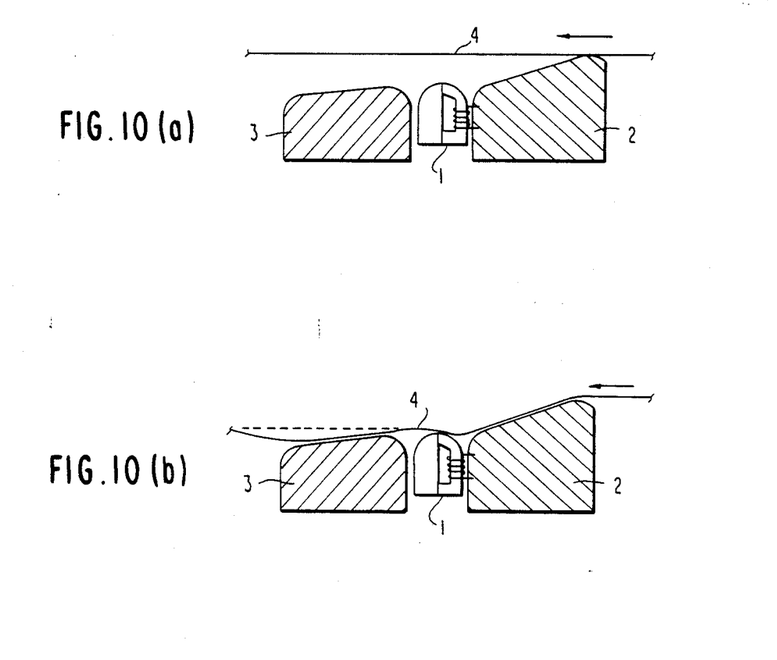

To make a high-density recording on a flexible magnetic disk, a magnetic head must be contacted stably with the flexible magnetic disk. For this purpose, there has been proposed in Japanese Patent Publication Laid-open No. 9868/1986 a method which uses negative pressure to achieve a head touch. As shown in FIG. 10(a), when slanted head sliding members 2 and 3 are provided at the upstream side and the downstream side of a magnetic head 1, a negative pressure is generated between the head sliding members 2 and 3 and the flexible magnetic disk 4. As a result, as shown in FIG. 10(b), the flexible magnet disk 4 is attracted towards the head sliding members 2 and 3 to contact stably with the magnetic head 1. Thus, a stable head touch is achieved using a negative pressure, but this method cannot be used for double-sided recording.

As a method for double-sided recording on a flexible magnetic disk, Japanese Patent Publication Laid-open No. 1168/1987 discloses a method in which magnetic heads are placed on both sides of a flexible magnetic disk, and a pad is contacted directly against the flexible magnetic disk to cause the disk to touch either of the magnetic heads.

Since, however, in the method disclosed in Japanese Patent Publication Laid-open No. 1168/1987, the pad is in contact directly with the surface of the flexible magnetic disk, there is a danger of scratching the surface of the recording medium which may cause a drop-out. Moreover, if the flexible magnetic disk is set in position in a recording/reproduction device and the pad and the magnetic head contact the flexible magnetic disk at a same position for a long time, the flexible magnetic disk may undergo plastic deformation which will make the disk unusable.

Further, a frictional force applies when the pad is pressed against the flexible magnetic disk and disappears when the pad is removed which, when the recording operation is switched from the front side to the back side or vice versa, causes a substantial change in load and hence perturbation in servo operation. Therefore, stable recording is not obtained immediately after switching the recording surface. In addition, a mechanism which linearly moves the pad to touch the flexible magnetic disk tends to have a large inertia, which is slow in moving speed and cannot provide instant switching of recording surface.

With a view to obviate all of the prior art defects of recording methods, it is a primary object of the present invention to provide a double-sided recording method which can provide instant switching of recording surface with no contact with a flexible magnetic disk.

DISCLOSURE OF THE INVENTION

In accordance with the present invention which attains the above object, there is provided a double-sided recording method comprising disposing first and second magnetic heads opposed to each other on both sides of a rotating flexible magnetic disk, and placing a guide plate at the upstream or downstream side of the first or second magnetic head, the guide plate being slanted to apply a negative or positive pressure to the flexible magnetic disk and to cause the flexible magnetic disk to be attracted to the first or second magnetic head.

When the guide plate is slanted so that the plate approaches the rotating flexible magnetic disk more at the downstream than at the upstream side, a positive pressure is generated between the guide plate and the flexible magnetic disk. On the other hand, when the guide plate is slanted so that the plate goes away from the rotating flexible magnetic disk more at the downstream that at the upstream side, a negative pressure is generated between the guide plate and the flexible magnetic disk. Thus, when a positive pressure and/or a negative pressure are generated independently or simultaneously at the upstream and downstream sides of the magnetic heads, the flexible magnetic disk can be attracted and/or urged to one of the magnetic heads.

BRIEF DESCRIPTION OF THE DRAWINGS

FIGS. 9(a), (b), and (c) are schematic front views of other examples of guide plates that can be used in the present invention.

FIGS. 10(a) and (b) are schematic views showing a prior art magnetic recording/reproduction device.

DESCRIPTION OF PREFERRED EMBODIMENTS

Preferred embodiments of the present invention will now be described in detail with reference to the drawings.

Figure 1:
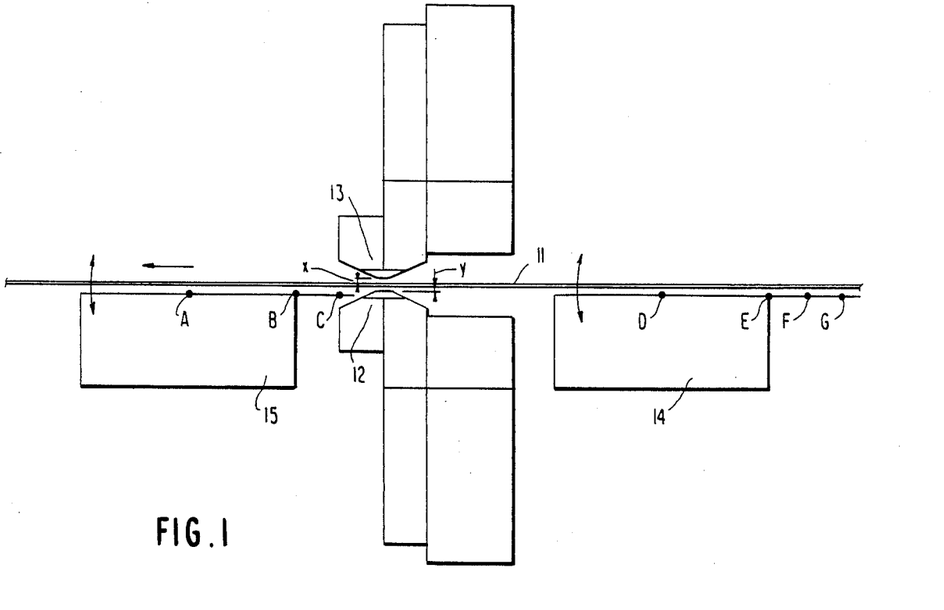
FIG. 1 is a schematic view showing the structure of a device used in an embodiment of the present invention.

In the present invention, a device, for example, as shown in FIG. 1 is used. In the device, opposing first and second magnetic heads 12 and 13 are disposed on both sides of a flexible magnetic disk 11. In the standstill state, the first magnetic head 12 is more distant than the second magnetic head 13 from the flexible magnetic disk, with a relation $X \leq Y$ of a distance Y between the first magnetic head 12 and the flexible magnetic disk 11, and of a distance X between the second magnetic head 13 and the flexible magnetic disk 11. The magnetic heads 12 and 13 have lengths of several hundred $\mu m$ and the distances X and Y are also several hundred $\mu m$. The magnetic heads 12 and 13 need not necessary be opposed exactly to each other, but rather are preferably disposed with a divergence in the radial direction. This is to prevent an accidental collision between the opposing magnetic heads when an external force is applied.

Further, guide plates 14 and 15 are disposed at the upstream and downstream sides of the first magnetic head 12. The guide plates 14 and 15 have lengths of several mm to 1 cm, which may be moved along with radial movement of the magnetic heads 12 and 13 or may be fixedly disposed along the radial direction of the flexible magnetic disk 11.

Figure 2:
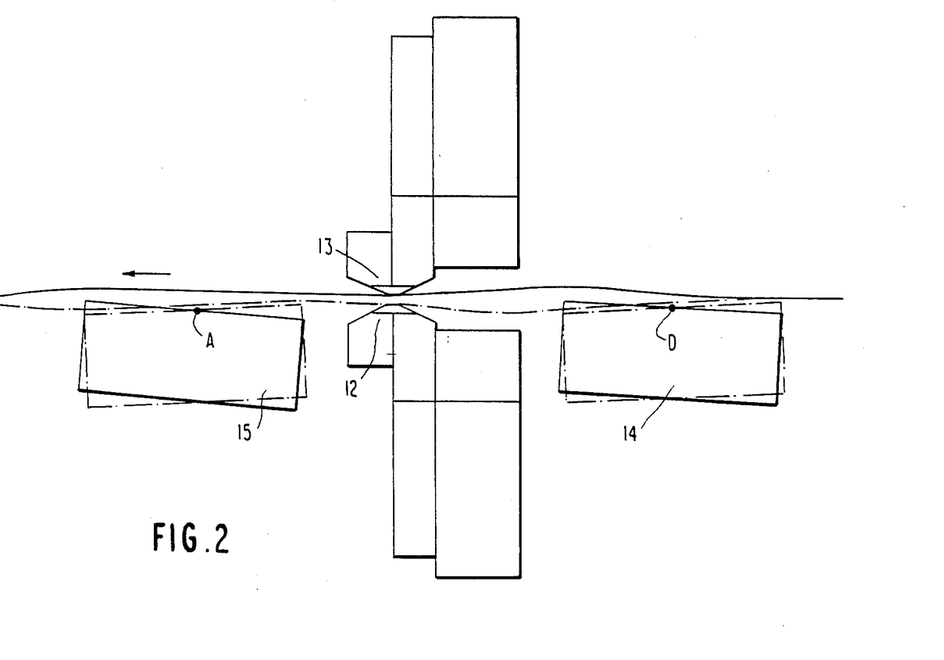
FIG. 2 is a schematic view showing the deflection of the rotating flexible magnetic disk to each of the magnetic heads.

With the device having the above arrangement, when, as shown in FIG. 2, the flexible magnetic disk 11 is rotated and the guide plates 14 and 15 are slanted as shown by solid lines, the flexible magnetic disk 11 is urged by positive pressure towards the second magnetic head 13. Thus, when the guide plates are slanted so that the downstream side is closer than the upstream side to the flexible magnetic disk 11 (unloaded), positive pressure is generated between the guide plates and the flexible magnetic disk 11 to urge the flexible magnetic disk 11 upward. In contrast, when the guide plates 14 and 15 are slanted so that the downstream side is more distant than the upstream side from the flexible magnetic disk 11 as shown by dot-bar lines in FIG. 2, negative pressure is generated between the guide plates and the flexible magnetic disk 11 which attracts the flexible magnetic disk 11 downward. Thus, the guide plates 14 and 15 are slanted to generate positive or negative pressure, thereby recording on the front or back side of the flexible magnetic disk 11. The guide plates 14 and 15, which are to urge or attract the flexible magnetic disk 11 by positive or negative pressure, do not make contact with the flexible magnetic disk 11. When urging the flexible magnetic disk 11 by positive pressure, a relatively small slant angle can produce a sufficient contact pressure to the second magnetic head 13 but, when to attract the flexible magnetic disk 11 by negative pressure, a relatively large slant angle is required to obtain a sufficient contact pressure. Therefore, the second magnetic head 13 is disposed closer to the flexible magnetic disk 11 than is the first magnetic head 12. This can reduce deformation of the flexible magnetic disk 11. Slanting of the guide plates 14 and 15 is a rotation of several degrees or a rotation associated with a linear movement. In the embodiment shown in FIG. 2, for example, the guide plate 14 rotates around a center D, and the guide plate 15 rotates around a center A. As shown in FIG. 1, the centers of rotation may be located at the upstream ends E and B of the guide plates 14 and 15, or at points F and C at the upstream sides of the upstream ends of the guide plates 14 and 15. When the guide plates 14 and 15 are rotated independently, the rotational centers can be located at upstream sides of the centers of the plates to prevent contact of the guide plates 14 and 15 with the flexible magnetic disk 11. Further, rather than the independent rotation, the guide plates 14 and 15 can be rotated integrally, around a further upstream point G. Integral rotation has an advantage that the mechanism can be simplified since it has a single center of rotation. Also, the integral rotation and independent rotation can be used in combination. On the other hand, when linear movements are combined to slant the guide plates, the upstream and downstream sides of the guide plates can be supported with piezoelectric elements, which are energized selectively.

Figure 3:
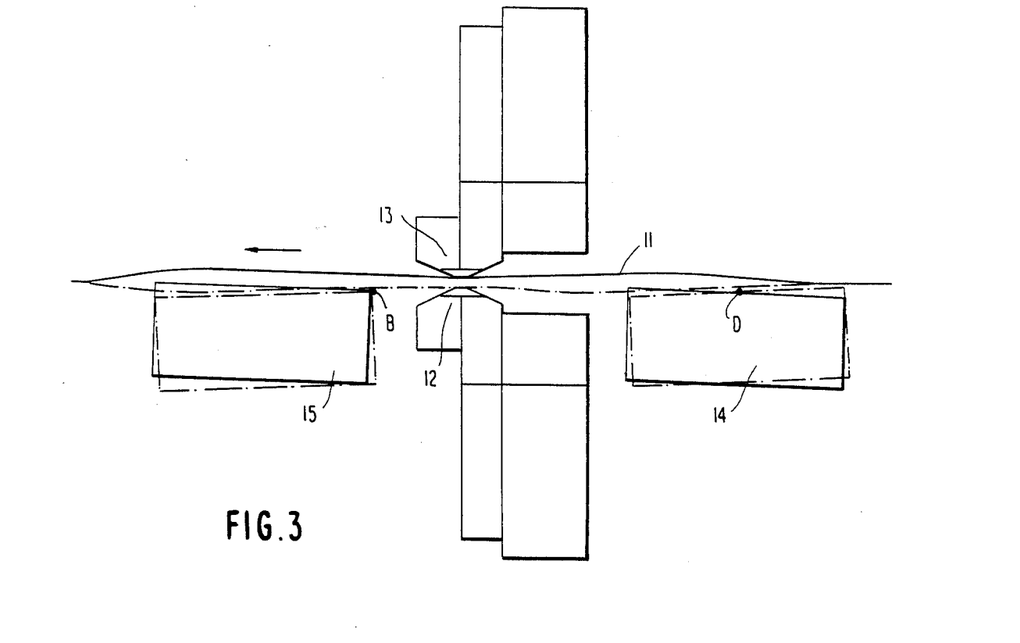
FIG. 3 and FIG. 4 are schematic views showing structure of other devices used in the present invention.

Another embodiment of the present invention shown in FIG. 3 will now be described. In this embodiment, the guide plates 14 and 15 are rotated independently, but the center of rotation of the guide plate 14 is located at the center D of the guide plate 14, whereas the center of rotation of the guide plate 15 is located at the upstream end B. The guide plates are slanted to produce a positive or negative pressure, and the flexible magnetic disk 11 is caused to contact with the magnetic head 12 or 13.

Figure 4:
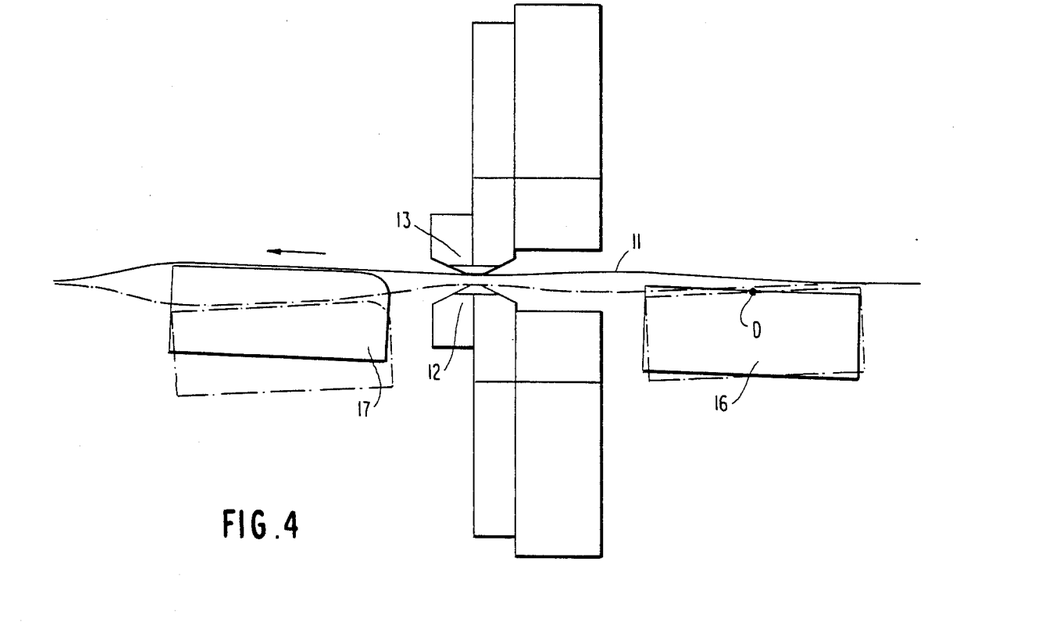

FIG. 4 shows another embodiment of the present invention in which guide plates 16 and 17 are rotated integrally. In this embodiment, the center of rotation is located at the center D of the guide plate 16. This embodiment also has the same effect as the above-described embodiments. Other constructions are the same as in the preceding embodiments and are not described here.

Figure 5:
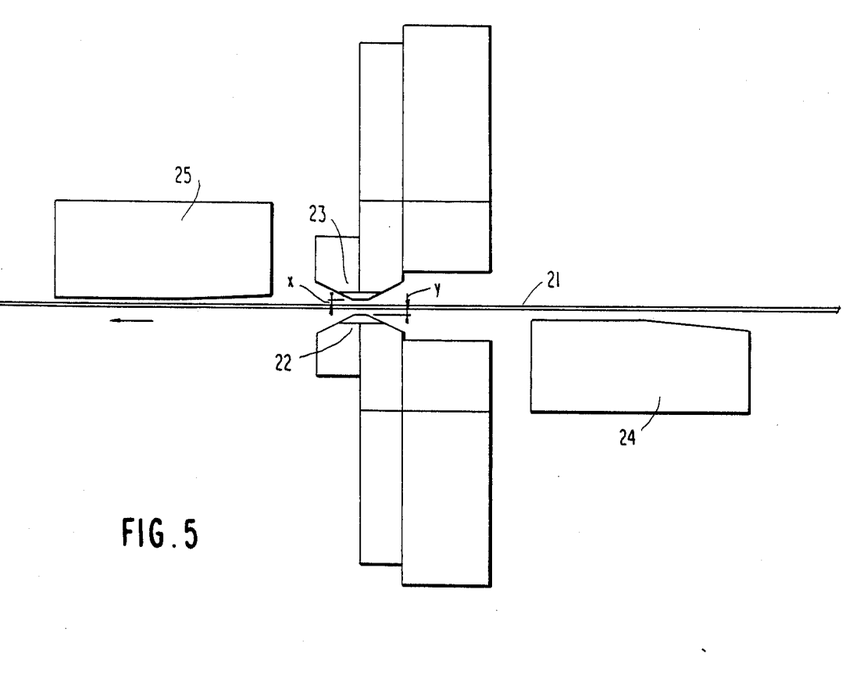
FIG. 5 is a schematic view showing structure of a device used in another embodiment of the present invention.

Further, another embodiment of the present invention will now be described with reference to FIG. 5. In this embodiment, guide plates are disposed asymmetrically. Opposing magnetic heads 22 and 23 are disposed at both sides of a flexible magnetic disk 21. The magnetic heads 22 and 23 are not symmetrical to the flexible magnetic disk 21 at a standstill, but there is a relation $X \leq Y$ of a distance Y between the magnetic head 22 and the flexible magnetic disk 21 to a distance X between the magnetic head 23 and the flexible magnetic disk 22. The magnetic heads 22 and 23 have lengths of several hundred $\mu$m and distances X and Y are several hundred $\mu$m. The magnetic heads 22 and 23 are not necessary to be opposed exactly to each other, but rather are preferably disposed with a clearance in the radial direction. This is to prevent an accidental hit between the opposing magnetic heads when an external force is applied.

Further, a guide plate 24 is disposed at the upstream side of the magnetic head 22 and a guide plate 25 is located at the downstream side of the magnetic head 23. At a standstill, the upstream side guide plate 24 is farther from the flexible magnetic disk 21 than is the downstream side guide plate 25. The guide plates 24 and 25 have lengths of several mm to 1 cm, which may be moved along with radial movement of the magnetic heads 22 and 23 or may be fixedly mounted along the radial direction of the flexible magnetic disk 21.

Figure 6:
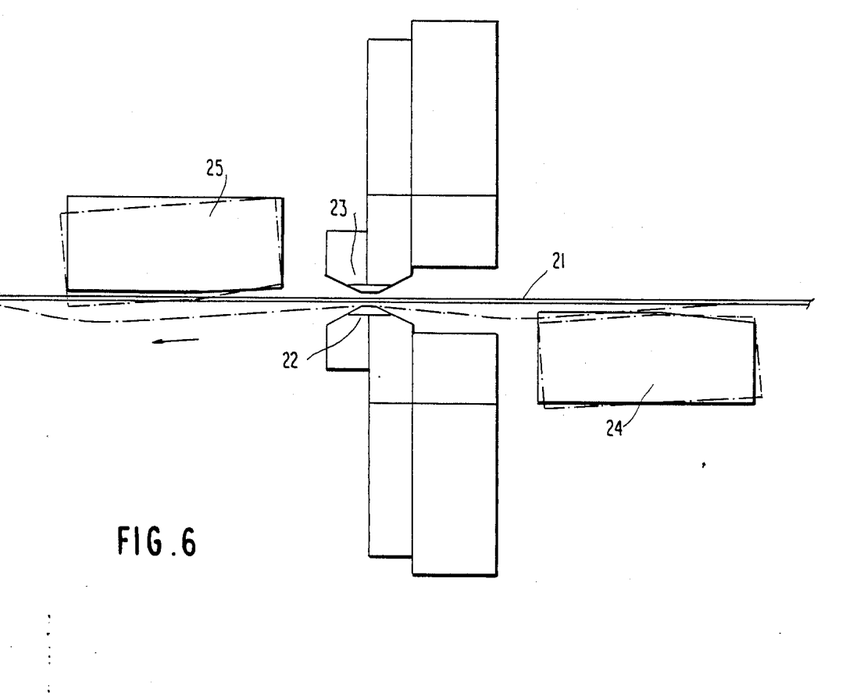
FIG. 6 and FIG. 7 are schematic views showing the deflection of the rotating flexible magnetic disk caused by positive and negative pressures.
Figure 7:
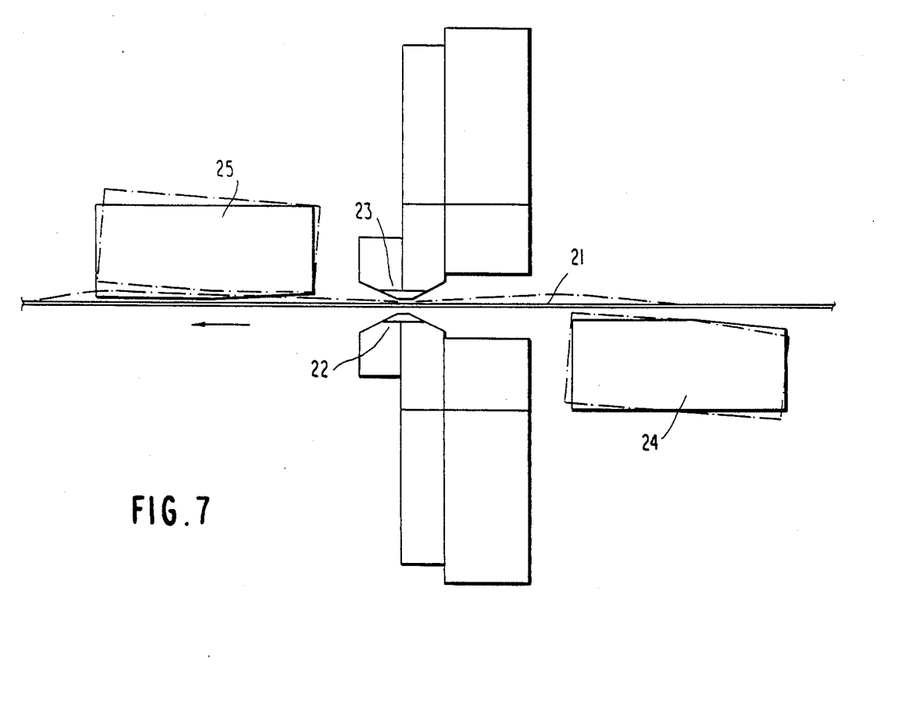

With the device having the above arrangement, when, as shown in FIG. 6, the flexible magnetic disk 21 is rotated and the guide plates 24 and 25 are slanted as shown by solid lines, the flexible magnetic disk 21 is urged by a positive pressure towards the magnetic head 22. Thus, when the guide plate 24 is slanted so that the downstream side of the guide plate 24 is farther than the upstream side from the flexible magnetic disk 21 (undeflected), a negative pressure is generated between the guide plate and the flexible magnetic disk 21. At the same time, when the guide plate 25 is slanted so that the downstream side of the guide plate 25 is closer than the upstream side to the flexible magnetic disk 21, a positive pressure is generated between the guide plate and the flexible magnetic disk 21. As a result, the flexible magnetic disk 21 is attracted by the negative pressure and urged by the positive pressure to make contact with the magnetic head 22. In contrast, when, as shown by dot-bar lines in FIG. 7, the guide plate 25 is slanted so that the downstream side of the guide plate 25 is more distant than the upstream side from the flexible magnetic disk 21 (undeflected), a negative pressure is generated between the guide plate and the flexible magnetic disk 21. At the same time, when the guide plate 24 is slanted so that the downstream side of the guide plate 24 is closer than the upstream side to the flexible magnetic disk 21, a positive pressure is generated between the guide plate and the flexible magnetic disk 21. As a result, the flexible magnetic disk 21 is attracted by the negative pressure and urged by the positive pressure to make contact with the magnetic head 23. Thus, the guide plates 24 and 25 are slanted to generate a positive or negative pressure, thereby recording on the front or back side of the flexible magnetic disk 21. The guide plates 24 and 25, which are to urge or attract the flexible magnetic disk 21 by a positive or negative pressure, do not make contact with the flexible magnetic disk 21. In this embodiment, the magnetic heads 22 and 23 and the guide plates are not disposed at the same distances from the flexible magnetic disk 21, but these may be disposed at the same distances. Slanting of the guide plates 24 and 25 is a rotation of several degrees or a rotation associated with a linear movement. For example, when rotating the guide plates 24 and 25 independently, the guide plates can be rotated around points at upstream sides of the centers of the plates. When rotating the guide plates 24 and 25 integrally, they can be rotated around a point which is located at a sufficiently upstream side. Integral rotation has an advantage that the mechanism can be simplified since it has a single center of rotation. Also, the integral rotation and independent rotation can be used in combination. On the other hand, when linear movements are combined to rotate the guide plates, the upstream and downstream sides of the guide plates can be supported with piezoelectric elements, which are energized selectively.

Figure 8:
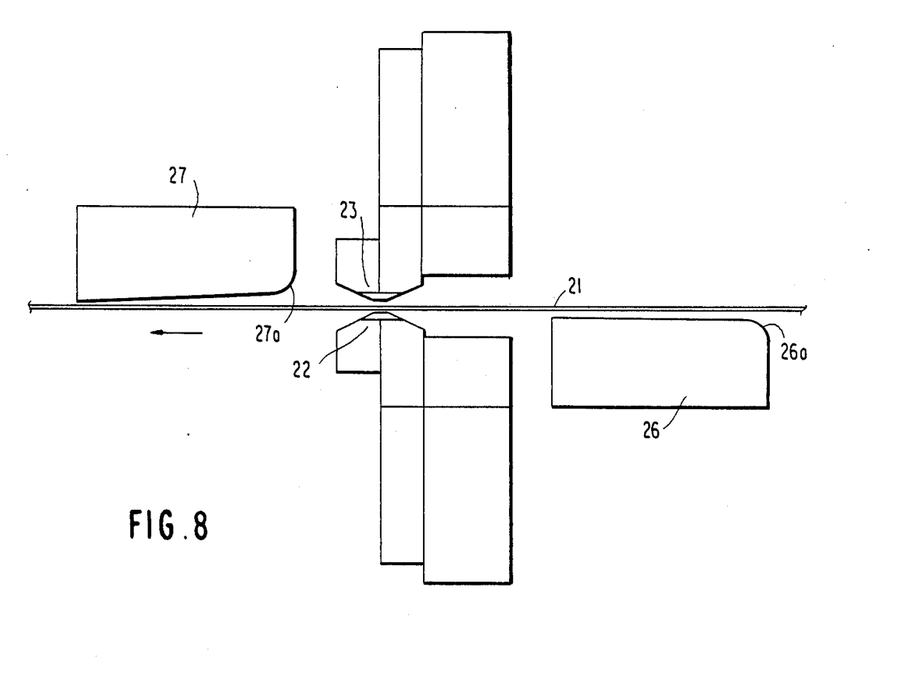
FIG. 8 is a schematic view showing structure of another device used in the present invention.
Figures 9A, 9B, 9C:
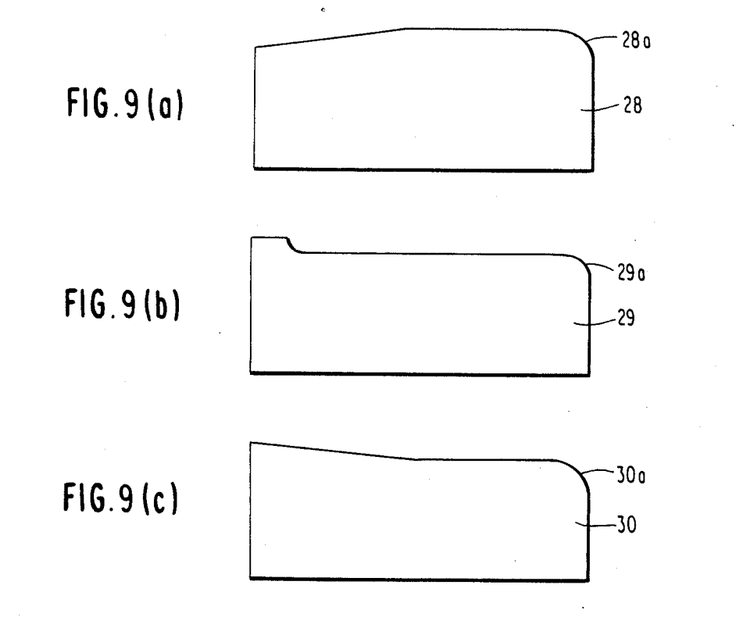

Next, another embodiment of the present invention will now be described with reference to FIG. 8. In this embodiment, magnetic heads 22 and 23 are disposed symmetrically with respect to a flexible magnetic disk 1. Moreover, upstream ends 26a and 27a of guide plates 26 and 27 are chamfered to curved surfaces. With this configuration, the flexible magnetic disk will not be damaged even if the guide plates 26 and 27 are slanted to a large extent. The shape of the guide plates are not restricted to those described in the above embodiments but, alternatively, for example, as guide plates 28, 29, and 30 shown in FIG. 9, upstream ends 28a, 29a, and 30a can be chamfered to curved surfaces. With this configuration, the flexible magnetic disk will not be damaged even if the guide plates 28, 29, and 30 are slanted to a large extent.

Figure 11:
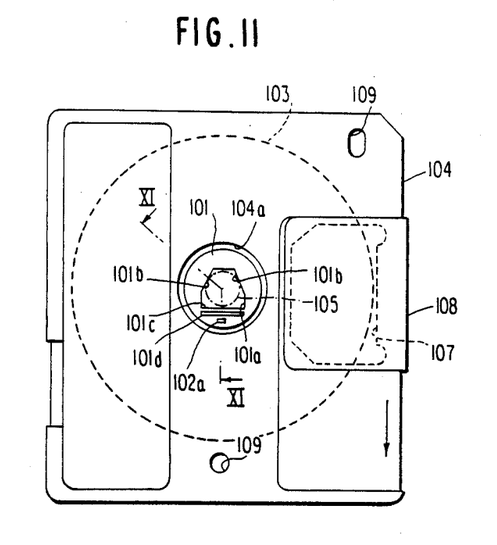
FIG. 11 is a schematic front view of a flexible magnetic disk named still video floppy.
Figure 12:
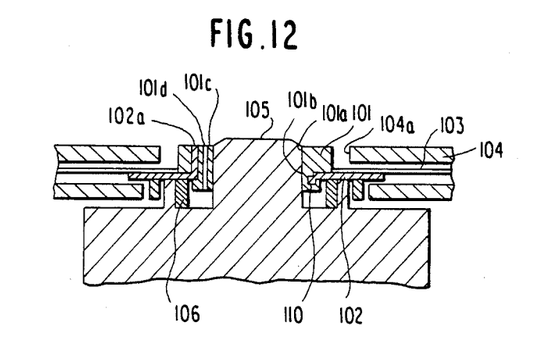
FIG. 12 is a schematic sectional view taken along the line XI—XI in FIG. 11.

As the flexible magnetic disk used in the present invention, video flexible magnetic disks as shown in FIG. 11 and FIG. 12 are preferable. In the video flexible magnetic disk, a magnetic sheet 103 on which still picture information or the like is recorded is rotatably contained in a nearly square case 104. The circular magnetic sheet is provided at its center with a center core 101 as a reinforcing member, and the center core 101 is exposed to outside through a circular center opening 104a of the case 104. Metal part of a core plate 102 which is made of a magnetic metal is embedded concentrically in the outer peripheral part of the resin-made center core 101. The magnetic sheet 103 is bonded concentrically with the outer peripheral part of the core plate 102.

The center core 101 has a polygonal center hole 101a into which a drive spindle 105 is inserted, and a slit 101d is provided on a side of the center hole 101a. The slit 101d forms a spring section 101c which has a spring action. A positioning surface 101b is formed on an inner peripheral surface of the center hole 101a opposing the spring section 101c, and the spindle 105 inserted into the center hole 101a is pressed against the positioning surface 101b by the spring section 101c, thereby ensuring concentricity of the spindle 105 and the center core 101.

Further, the case 104 has a window 107 at which the magnetic head is located. The magnetic head window 107 is opened and closed by a slidable shutter 108. Before the magnetic sheet unit is loaded on the recording-/reproduction device, the shutter 108 closes the window 107 to protect the magnetic sheet 103 from dust and, when the magnetic sheet unit is set in position in the recording/reproduction device, the shutter 108 moves downward in FIG. 7 to open the window 107, and the magnetic sheet 103 is ready for recording and reproduction. Further, the case 104 is provided with a positioning hole 109.

A magnet is used as means to detachably mount the magnetic sheet 103 on the spindle 105. As shown in FIG. 12, a magnet 106 is embedded in the flange of the spindle 105 of the recording/reproduction device to attract the core plate 102, thereby detachably mounting the center core 101 on the spindle 105. The magnetism of the magnet 106 is also introduced from a PG yoke 102a which is integrally molded with the core plate 102 to the upper surface of the center core 101, thereby determining the rotational angle of the magnetic sheet 103.

As described above in detail with reference to the embodiments, the present invention uses negative and positive pressures generated by slanting the guide plates to record on both sides of the flexible magnetic disk with no contact of the guide plates with the flexible magnetic disk. This prevents the flexible magnetic disk from scratching and reduces fluctuations in load. When the flexible magnetic disk is stopped rotating, the negative and positive pressures disappear and the flexible magnetic disk is distanced away from the magnetic heads, thereby preventing plastic deformation of the flexible magnetic disk.

What is claimed is:

1. A double-sided recording method comprising the following steps:
    disposing first and second magnetic heads opposed to each other on opposite sides of a rotating flexible magnetic disk; and
    placing first and second guide plates at an upstream and downstream side, respectively, of said first or second magnetic head, said guide plates being adjustably slanted toward a surface of said flexible magnetic disc head to apply negative or positive pressure to said flexible magnetic disk and to cause said flexible magnetic disk to be attracted or urged to said first or second magnetic head.

2. A double-sided recording method as claimed in claim 1, wherein said guide plates are disposed respectively at the upstream and downstream sides of said first magnetic head, a distance between said first magnetic head and said flexible magnetic disk is equal to or greater than a distance between said second magnetic head and said flexible magnetic disk, and a slanting angle of said guide plates when applying negative pressure to said flexible magnetic disk is greater than a slanting angle of said guide plates when applying positive pressure to said flexible magnetic disk.

3. A double-sided recording method as claimed in claim 2, wherein said guide plates are slanted by rotating each of said guide plates around a center point of each of said guide plates, respectively.

4. A double-sided recording method as claimed in claim 2, wherein said guide plates are slanted by rotating each of said guide plates around an upstream point of each of said guide plates, respectively.

5. A double-sided recording method as claimed in claim 2, wherein said first guide plate is slanted by rotating said first guide plate around a center point of said first guide plate and wherein said second guide plate is slanted by rotating said second guide plate around an upstream point of said second guide plate.

6. A double-sided recording method as claimed in claim 2, wherein said first and second guide plates are slanted by integrally rotating said first and second guide plates around a center point of said first guide plate.

7. A double-sided recording method comprising the following steps:
 disposing first and second magnetic heads opposed to each other on opposite sides of a rotating flexible magnetic disk; and
 placing a first guide plate at an upstream side of said first magnetic head and a second guide plate at a downstream side of said second magnetic head, said guide plates being adjustably slanted with respect to a surface of said magnetic flexible disk to apply negative or positive pressure to said flexible magnetic disk and to cause said flexible magnetic disk to be attracted or urged to said first or second magnetic head.

8. A double-sided recording method as claimed in claim 7, wherein said guide plates are slanted so that said second side plate simultaneously applies positive pressure while said first guide plate applies negative pressure to said flexible magnetic disk.

9. A double-sided recording method as claimed in claim 8, wherein upstream ends of said first and second guide plates are chamfered to curved surfaces.

* * * * *